United States Patent [19]

Strantz

[11] 4,246,990
[45] Jan. 27, 1981

[54] REMOTE CONTROL SYSTEM FOR AN AUTOMOTIVE TRANSMISSION IN AN EARTH-MOVING VEHICLE

[75] Inventor: Lawrence D. Strantz, Washington, Ill.

[73] Assignee: Westinghouse Air Brake Company, Peoria, Ill.

[21] Appl. No.: 354

[22] Filed: Jan. 2, 1979

[51] Int. Cl.³ ..................... B60K 41/10; B60K 41/26
[52] U.S. Cl. ..................... 192/4 C; 74/752 C; 74/861; 74/867; 74/878; 91/167 R; 137/814
[58] Field of Search ................. 74/856, 861, 867, 878, 74/752 C; 192/4 C, 3.51, 3.61, 3.62; 137/814, 815, 821, 826; 91/167 R

[56] References Cited

U.S. PATENT DOCUMENTS

| | | | |
|---|---|---|---|
| 3,481,435 | 12/1969 | Pearce et al. | 192/4 C |
| 3,605,966 | 9/1971 | Erdman | 91/167 R X |
| 3,613,505 | 10/1971 | Bubula | 137/821 X |
| 3,692,160 | 9/1972 | Hilpert | 192/4 C |
| 3,713,364 | 1/1973 | Francia | 91/167 R X |
| 3,741,018 | 6/1973 | Katz et al. | 137/826 X |
| 3,882,759 | 5/1975 | Formwalt et al. | 91/167 R |
| 4,111,074 | 9/1978 | Northup | 74/867 |

Primary Examiner—Rodney H. Bonck
Attorney, Agent, or Firm—Leydig, Voit, Osann, Mayer & Holt, Ltd.

[57] ABSTRACT

A remote control system for an automotive transmission in an earth-moving vehicle which includes a fluidic variable frequency oscillator having a variable feedback loop controlled by a quadrant lever which acts as a gear shift control. When the lever is moved between spaced transmission control positions, the frequency of the signal at the output is swept through the frequencies corresponding to intermediate control positions. The waveform of the output signal is non-symmetrical having a fixed "off" time and an "on" time which varies in length as an inverse function of the frequency. The output signal is fed to a fluidic transmitter, then through a pair of conduits to a fluidic receiver. The "on" output port of the receiver feeds into a manifold developing pressure therein which varies with the degree of dissymmetry of the wave, that is, inversely with frequency. A plurality of Schmitt triggers have their control ports connected to the manifold and have reference ports progressively biased so that pressure is produced at their output ports in succession. A power actuator of the progressive indexing type is connected to the Schmitt trigger output ports and is mechanically coupled to the gear shift member of the transmission to provide smooth transition through the gears regardless of the magnitude of the change in gear ratio. The lowest gear is interlocked with engine speed to prevent going into this gear when the engine speed is too high. The reverse gear is effectively interlocked with a forward motion detector to insure that the vehicle is at standstill before the transmission may shift into reverse.

11 Claims, 14 Drawing Figures

4,246,990

REMOTE CONTROL SYSTEM FOR AN AUTOMOTIVE TRANSMISSION IN AN EARTH-MOVING VEHICLE

SUMMARY OF THE INVENTION

In heavy earth-moving vehicles the engine and transmission are usually located at some distance from the operating position so that a remote control system is necessary for operation of the shift member which controls the numerous gear settings of the transmission. Since it is customary to operate an engine of an earth-moving vehicle at rated speed and horsepower, it is particularly desirable to provide a remote control system which effects shifting both reliably and smoothly. It is further desirable to provide a remote control system which protects the engine and drive train from careless action on the part of the operator, such as going into first gear at excessive engine speed or going into reverse gear with the vehicle still in forward motion.

It is, accordingly, an object of the present invention to provide a remote control system for a transmission on an earth-moving vehicle which has a high degree of reliability combined with a maximum of operating convenience. Indeed, it is an object to provide a transmission control system which makes novel use of fluidics to bring about a degree of reliability which exceeds that which is obtainable in alternative electrical, mechanical and hydraulic systems.

It is, moreover, an object of the invention to provide a remote control system which may be employed on even the largest earth-moving vehicles and which is capable of reliably spanning the distance between the operating station and the controlled transmission, a distance which may be up to forty feet in the case of the largest vehicles.

It is a related object to provide a remote control for a transmission in which there is no limit to the size of the transmission which may be controlled and in which the system is, nevertheless, highly economical and compact, using but a negligible amount of power in the form of compressed air already available on the vehicle.

It is yet another object of the invention to provide a remote control system for a transmission in an earth-moving vehicle or the like which is highly flexible and which can be used with only minor modification on different types of vehicles and with different types of transmissions. In this connection it is an object to provide a remote control system in which certain functions are interlocked for reasons of safety and which permits the interlocking to be extended, as might be desired, to additional functions with only minor change.

BRIEF DESCRIPTION OF THE DRAWINGS

Other objects and advantages of the invention will become apparent upon reading the attached detailed description and upon reference to the drawings in which:

FIG. 3a–3h show a power actuator of the progressive indexing type used in the system of FIG. 1 in successive conditions of expansion.

While the invention has been described in connection with a preferred embodiment, it will be understood that there is no intention to limit the invention to the particular embodiment shown and that, on the contrary, I intend to cover the various alternative and equivalent constructions included within the spirit and scope of the appended claims.

DETAILED DESCRIPTION OF THE PREFERRED EMBODIMENT

Figure 1:
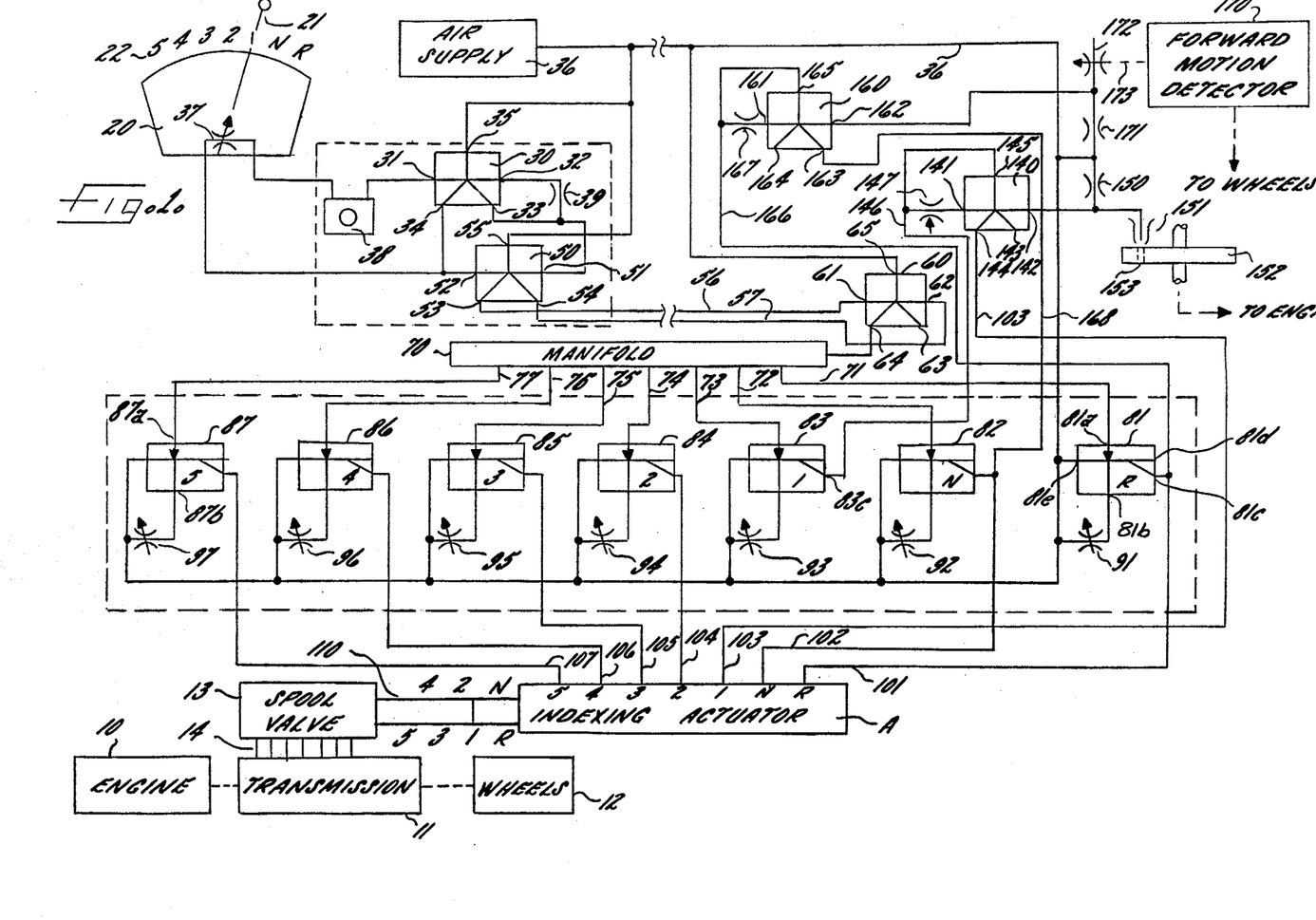
FIG. 1 is a schematic diagram showing a remote control system constructed in accordance with the present invention.

In a heavy duty scraper, representative of a class of heavy earth-moving vehicles, the engine and transmission may be located in the scraper section while the operating position is in the so-called "tractor". To understand the present invention it is not necessary to illustrate the construction of such a machine and it will suffice to note that the engine, indicated at 10, is coupled by means of a multi-speed transmission 11 to ground-engaging wheels 12. Associated with the transmission is a gear shift member 13, here in the form of a spool valve, having a plurality of pressurized outlets 14 for controlling the internal clutches of the transmission (not shown) which effect the actual changing of the gears.

For remotely controlling the movement of the control plunger within the spool valve 13, a shift quadrant 20 is is provided at the operating position of the vehicle including a quadrant lever 21 which is manually positionable with respect to a scale of gear settings 22. In the present embodiment it will be assumed that there is a single reverse gear, a neutral position, and five forward gears.

In carrying out the invention the shift quadrant serves to control the frequency of a fluidic variable frequency oscillator producing a non-symmetrical waveform, the dissymmetry of which changes progressively with a variation in frequency. The oscillator in the present instance is in the form of a fluidic bistable device 30 having first and second control ports 31, 32 and corresponding on and off pressurized output ports 33, 34. Air is fed into the device via a supply port 35 from a source of pressurized air 36.

The bistable device 30 operates in typical fashion in accordance with the so-called "Coanda effect": With the supply port 35 pressurized, a fluid, conventionally air, passing therethrough encounters a fork in its path to output ports 33, 34. Application of a control pressure impulse to port 31 causes the incoming stream of air to be directed exclusively through the output port 33, which condition stably persists. Conversely, a pressure impulse applied to the second control port 32 causes shifting of the stream from output port 33 to output port 34, again causing stable and persistent pressure at the latter.

To convert the bistable device 30 into an oscillator producing a non-symmetrical waveform, a first feedback circuit, having a variable resistor 37 and a series capacitor 38, is interposed between ports 31, 34, while a second feedback circuit including simply a fixed resistor 39 is interposed between ports 32, 33. It is preferred to couple the quadrant lever to the resistor 37, although it will be apparent to one skilled in the art that the capacitor 38 may be alternatively varied by the quadrant lever to accomplish the same frequency-changing effect. With given values of resistance and capacitance in the circuit, the bistable device 30 will tend to operate as a multivibrator or relaxation oscillator, at a particular frequency. Thus, in a typical cycle, assuming output port 33, the "off" port, to be pressurized, such pressure, transmitted by resistor 39, produces a pulse at control port 32, switching the inlet jet of air so that it is diverted down the opposite path, appearing as an output pressure at port 34. The point of transition plotted on a time-pressure scale is indicated at 41 in FIG. 2. The pressure at port 34, acting through the variable feedback loop 37, 38, applies control pressure to control port 31 to switch the incoming stream of air back to its initial state, depressurizing output port 34 and restoring pressure to output port 33. This point of switching, indicated at 42, determines the end of the "on" time t1 of the oscillator. This condition persists for a fixed, or reference, "off" time tr, determined by the resistor 39, until pressure at control port 32 is again effective to turn the device to its on condition, the switch point being indicated at 43. The cycle is endlessly repeated. While the wave shape is shown in FIG. 2 as "square", it will be understood that in an actual device the wave is a hybrid, approximately midway between a square wave and a sine wave.

Figure 2:
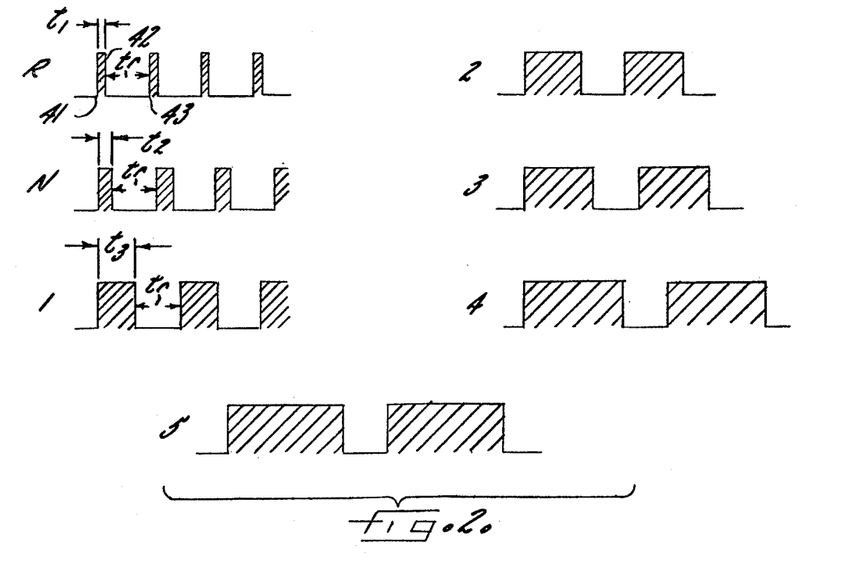
FIG. 2 is a set of figures showing the variation in non-symmetry of the waveform of the signal utilized in the present invention.

To change the frequency of the wave, the quadrant lever 21 is moved upscale in a direction to increase throttling at the variable resistor 37, resulting in an increase in "on" time to t2 (see again FIG. 2). The "off" time remains at a level tr since the value of resistor 39 is constant. It will be noted that the change in frequency occurs progressively with movement of the lever and that the effect is not only to decrease the oscillating frequency but to increase the dissymmetry of the output wave, in shor, to increase the proportion of "on" time. A still further movement of the quadrant lever upscale has the effect of further increasing the time constant, resulting in an "on" time t3 with the dissymmetry of the wave being further increased. It is found that an oscillator of the type shown may, for present purposes, be made to operate stably through a frequency range of 120 to 20 Hz. upon moving the quadrant lever over its range of control movement.

In carrying out the invention the output signal from the oscillator 30 is fed into a second, and larger, bistable device which serves as an amplifier and transmitter of the signal to the remotely located transmission. Thus I employ a second bistable device 50 having control ports 51, 52, output ports 53, 54 and a supply port 55, with the control ports 51 and 52 being respectively and directly connected to the output ports 33, 34 of the oscillator. The transmitter output ports 53, 54 communicate, via lengthy conduits, or transmission lines, 56, 57, with a receiver 60 located adjacent the transmission. The receiver is in the form of a bistable device having control ports 61, 62 and output ports 63, 64 as well as a supply port 65 The receiver bistable device 60 serves as an amplifier to compensate for any losses occuring in the conduits 56, 57. Thus the signal appearing at the "on" output port 64 preserves the waveform of the signal appearing at the oscillator "on" port 34.

In accordance with the present invention the receiver "on" port discharges into a manifold which, in turn, feeds lines leading to the control ports of a plurality of Schmitt triggers having progressively stepped biasing pressures so that pressure is produced at the outlet ports of the Schmitt triggers successively in accordance with progressive movement of the manual quadrant lever between its control positions. The Schmitt triggers are connected in turn to the ports of a power actuator of the progressive indexing type which is mechanically coupled to the gear shift member of the transmission so that when the quadrant lever is moved between spaced control positions the transmission selectively goes through the gears corresponding to all of the intermediate positions.

Thus, referring again to FIG. 1, the "on" port 64 of the receiver 60 is connected to a manifold 70 having ports 71–77, inclusive, which are respectively connected to the control ports of Schmitt triggers 81–87. Each of the Schmitt triggers has ports denoted by letter subscript, port a being the control port, port b the reference port, port c the output port, port d a vent, and port e the supply port. It will be understood that each of the Schmitt triggers, while commercially available in unitary form, and while understandable with reference to the standard symbol which has been employed, is in fact formed as a composite of a number of bistable devices in cascaded relation, thereby producing a device of high sensitivity capable of being triggered on and off with extremely small differentials of input pressure. In short, the devices act as highly accurate pressure switches responsive to low values of control pressure and having an extremely low degree of hysteresis or detenting action.

For the purpose of applying stepped reference pressures to the respective reference ports of the triggers, to make each exclusively responsive to a certain level of pressure, adjustable resistors 91–97 are used respectively connected between the supply and reference ports. the adjustment of the reference resistors determines the point at which the Schmitt trigger will snap to the "on" condition, thereby pressurizing the respective output lines indicated at 101–107. By stepped adjustment of the resistors, using progressively lower resistance, the output lines 101–107 become steppingly pressurized.

It will be seen that the manifold and the progressively biased set of Schmitt triggers serve as a frequency-to-pressure converter, or dissymmetry-to-pressure converter, with the Schmitt triggers being successively triggered as the quadrant lever moves upscale from one setting to the next.

The reason for the conversion is that the waveform at the output of the receiver 60, which feeds the manifold, not only decreases in frequency upon an increased quadrant setting but also increases in its dissymmetry, with the "on" time bearing a progressively high ratio to the total time. In other words, as the frequency decreases, the proportion of the time that the "on" output port 64 of the receiver is turned on, that is, the proportion of the time that the output port 64 feeds the manifold 70, is increased, while the leakage from the manifold remains constant. Accordingly, more air is fed per unit time to the manifold under low frequency conditions than at high frequency. The net result is to produce a pressure in the manifold which varies as an inverse function of frequency. It is a simple matter to adjust the reference resistors 91–97 to stepped, progressively lower, values to bring about accordance between the settings of the quadrant lever and the cumulatively successive pressurization of the trigger output lines 101-107.

In accordance with one of the aspects of the present invention, a power actuator, or power cylinder, of the progressive indexing type having piston sections, with lost motion between them, fed by a registering series of ports, is interposed between the pressure lines and the spool valve 13 which controls the transmission 11. An advantage inherent in the use of an actuator of the illustrated progressive indexing type is that it has positional accuracy, being precisely indexed in accordance with existence of pressure at incrementally spaced ports independently of the magnitude of the pressure which is applied to the ports.

Figure 3A:
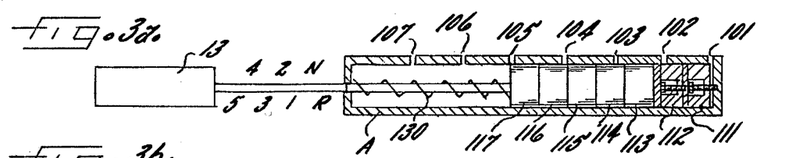
Figure 3B:
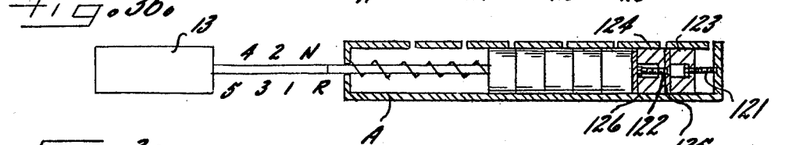

Referring to FIG. 3a, the indexing actuator, indicated at A, has a plunger 110 which is connected to a piston having separable sections 111-117 (see FIG. 3a) arranged like links in a chain. The sections, of which section 111 may be considered as representative, each consist of a short, disc-shaped cylindrical element having a lost motion connection with adjacent elements. Each piston element is penetrated by a cap screw on which the element is freely slidable, two of the cap screws being indicated respectively at 121, 122, the heads being movable within respective axial recesses 123, 124. Each of the piston elements has an integral cap plate as indicated at 125, 126. Each cap plate is threaded to receive the tip of the cap screw which extends from the adjacent piston element, except that the first cap screw 121 is, as shown in FIG. 3b, anchored in the inner end surface of the actuator.

The actuator is fitted with a longitudinally spaced series of ports which have been numbered to correspond to the pressurized lines 101-107. When the first port 101 is pressurized, the lost motion provided by the cap screw 121 is taken up causing the entire stack of piston elements to be moved to the left, to produce one step of plunger movement, to position R, against the restoring force of a return spring 130.

Figures 3C, 3D:
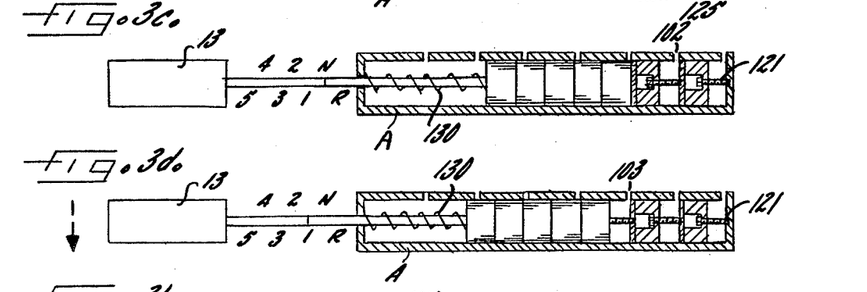
Figure 3H:
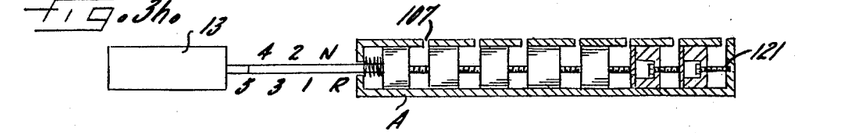

With pressure maintained in the line 101, subsequent pressurization of line 102 causes separation between the piston elements 111, 112, taking up the lost motion provided by the cap screw 122, thereby moving the plunger 110 out a further step of movement, namely, to position N, which is the neutral position. Next, pressurization of the line 103 causes separation between piston elements 112, 113 as set forth in FIG. 3d, causing movement of the plunger to position 1. In the same way, the plunger is additionally indexed by successive pressurization of the lines 104–107 until the piston is fully expanded with the plunger being indexed all the way to position 5 as illustrated in FIG. 3h.

The operation of the system as thus far described may be understood by considering a typical shift sequence, say, upwardly from gear number 1 to gear number 5. With the quadrant lever in the number 1 position, as illustrated in FIG. 1, the oscillator output wave is sufficiently assymetrical as to cause the receiver 60 to develop a pressure in the manifold 70 sufficient to turn the first three Schmitt triggers 81, 82, 83 to the "on" condition, thereby pressurizing lines 101, 102, 103 causing the first three sections 111, 112, 113 of the piston to separate, as illustrated in FIG. 3d, advancing the plunger 110 into its first gear position. Such position, sensed by the spool valve, directs energization of the clutches in the transmission so that the first gear is meshed.

When the quadrant lever 21 is moved through position 2, the added dissymmetry of the wave actuates the Schmitt trigger 84, pressurizing line 104, and causing the plunger 110 to move the spool valve into the second gear position. As the quadrant lever moves through positions 3 and 4 on the way to position 5, the further increase in the dissymmetry of the wave causes a progressive increase in manifold pressure thereby successively actuating triggers 85, 86 causing the transmission to be shifted into the third and fourth gears. Finally, as the quadrant lever moves into its fifth and highest position, the manifold achieves its highest pressure, thereby actuating the trigger 87, pressurizing line 107 hich causes the actuator to move into its most extended, or fifth, position illustrated in FIG. 3h.

The inverse sequence occurs as the quadrant lever is drawn back from the fifth gear to, say, second gear. The progressive increase in frequency, and decreasing dissymmetry of the wave, decreases the pressure in the manifold so that the pressure in line 77, applied to the control port 87a, becomes less than the bias pressure applied to the reference port 87b, thereby causing the air stream to be restored to its vented path and removing pressure from line 107. With pressure removed from the final port of the actuator, section 117 of the piston is urged into seated relation with respect to its neighboring section 116 by the restoring action of the spring 130. This places the transmission temporarily in fourth gear. As the quadrant lever traverses the third gear position, a further reduction in manifold pressure, acting through line 76, turns off the Schmitt trigger 86 which removes pressure from line 106 causing the actuator to retract an additional indexed amount into a position corresponding to third gear. When the quadrant lever, at the end of its shifting stroke reaches its second gear position, the Schmitt trigger 85 is turned off, removing pressure from line 105 and causing the actuator to position the spool valve in its second gear position where it stably remains. Since the transmission, regardless of the magnitude of the change in gear ratio, goes through all of the intermediate gear positions automatically, the result is to provide a smooth transition between the pre-existing and selected gears.

ENGINE SPEED INTERLOCK

Suppose, however, it is desired to go from the neutral condition into first gear. In accordance with one of the aspects of the present invention, an interlock is provided, sensitive to engine speed, which insures that the control system will not shift into first gear unless the engine speed is at a suitably low level. Such interlocking is accomplished by a speed-responsive bistable device placed effectively in series with the Schmitt trigger corresponding to first gear. Such device indicated at 140 has a control ports 141, 142, an "off" or vented output port 143 and an "on" output port 144 as well as a supply port 145. The supply port 145 of the bistable device 140 is connected as shown, via line 146 to the output port 83c of the Schmitt trigger 83. The control port 141 is fed through a resistor 147 from the same line 146 while the on output port 144 is connected to the actuator A via line 103.

The control port 142 is pressurized from the supply line 36 via a resistor 150. For the purpose of controlling the pressure at control port 142, the port communicates with a nozzle 151 which is arranged opposite a rotating disc 152 having a circular row of holes 153, the disc being mechanically coupled to the engine for rotation at a speed which is proportional thereto. The size of the nozzle orifice, its spacing from the disc, and the diameter and spacing of the holes, are so proportioned that air is inhibited from escaping from the nozzle as long as the engine and hence the disc are rotating at a speed which is at a safely low level. Under such conditions, the back pressure at port 142 exceeds the pressure at inlet port 141, causing the bistable device to turn on thereby pressurizing the "on" output port 144 which serves to conduct pressure into line 103 leading to the port of the actuator corresponding to first gear, as desired.

Suppose, however, that the vehicle operator should attempt to shift into first gear from neutral when the engine is running too fast. Movement of the quadrant lever from the neutral to first position will bring about a decrease in oscillator frequency and hence an increase in manifold pressure sufficient to turn on the trigger 83 associated with first gear which will, indeed, pressurize the outlet port 83c. This will, in turn, provide a supply of air to the supply port 145 of the device 140 as well as to control port 141. However, under high speed conditions the disc 153 will be turning so rapidly that air will be constantly leaked from the nozzle 151 at such a rapid rate that the nozzle back pressure, applied at port 142, will be less than the pressure at port 141, thereby causing the air entering the supply port 145 to be harmlessly diverted through the vent 143. As a result the line 103 will remain unpressurized so that the plunger 110 of the indexing actuator will not move out of its neutral position. However, as soon as the engine speed is appropriately reduced by the operator, the pressure at control port 142 will increase to exceed that available at 141, causing the incoming stream to be diverted to the "on" output port 144, pressurizing the line 103 and causing the plunger 110 to move, as desired, into the first gear position.

Such first gear speed interlock, it is to be noted, is also effective to protect the system if an effort is made to shift from neutral directly into any of the higher gears, for example, fifth gear, when the engine is running too fast. With the actuator initially in its neutral position as illustrated in FIG. 3c, assume that the operator moves the quadrant lever into the fifth gear position. This will cause maximum pressure to exist in the manifold 70 turning on all of the Schmitt triggers. Pressure line 103 corresponding to first gear will not be pressurized because of the interlocking function of the bistable device 140 described immediately above. Lines 104, 105, 106 and 107 will be pressurized. However, such pressurization will be ineffective to produce any separation between the piston sections since the actuator ports corresponding to lines 104–107 will be out of register with their sections. Consequently, the actuator plunger 110 will remain in a position corresponding to neutral.

However, when the engine speed is suitably reduced, pressurizing control port 142 of the interlock device 140 so that it becomes dominant, air pressure will be directed into line 103 causing separation between the second and third sections of the piston and moving the plunger into the first gear position. When the plunger is in its first gear position, the piston is in the proper condition of register with the already-pressurized line 104 so that separation will take place between the third and fourth sections of the piston placing the transmission in second gear and bringing the port 105 into condition of register. Such process is automatically repeated until the plunger 110 has moved to the end of its stroke and is in the fifth gear position. To insure that there is adequate time for each gear to act, plunger 110 may be provided with a dashpot or similar motion inhibitor.

FORWARD MOTION INTERLOCK

In accordance with a further feature of the present invention interlock means are provided for preventing the transmission from shifting into reverse gear as long as the vehicle is in motion. Let us assume, for example, that the vehicle is coasting straight ahead with the transmission in neutral and the operator, either inadvertently or intentionally, shifts into reverse gear. This will result, as we have previously noted, in the pressure in the manifold 70 dropping to the point where the neutral trigger 82 is turned off allowing the plunger of the indexing actuator to drop back to its "reverse" position so that the spool valve shifts the transmission into reverse. If the vehicle is proceeding at high forward speed when this occurs, the result may be catastrophic damage to a clutch in the transmission. While most operators would be careful not to make this mistake, it is nevertheless a common and negligent practice to shift into reverse while the vehicle is slowly coasting ahead, thereby using the reverse gear to brake forward movement as well as to drive the vehicle rearwardly. Even this practice can, in time, result in damage to the transmission.

Therefore, to guard against this condition an interlock in the form of a bistable device responsive to forward motion of the vehicle is effectively interlocked with the reverse gear setting. This is done by interposing the bistable device in parallel with the "neutral" Schmitt trigger 82 so that pressure is maintained at the neutral port of the indexing actuator as long as the vehicle is in motion and even though the quadrant lever may be in its reverse setting. Stated conversely, an interlock is provided which permits the indexing actuator to respond to a reverse signal from the shift quadrant only if there is present a signal proving that the vehicle is at a standstill.

The bistable device utilized for this forward motion interlock is indicated at 160 (FIG. 1) having control ports 161, 162, an "on" output port 163 and a vent 164. The supply port, indicated at 165, is fed from the output port 81c of the "reverse" Schmitt trigger via a line 166. The control port 161 is also supplied from the line 166 but via a resistor 167. The output port 163 is connected by a line 168 to the "neutral" actuator port 102.

The effect of the circuitry as thus far described is this: Whenever the operator shifts the quadrant lever into the reverse position, causing a drop in pressure in the manifold 70 to a level which is sufficient to sustain only the reverse trigger 81 in the "on" condition, the reverse trigger, at the same time, supplies fluid under pressure to the supply port 165 and control port 161 of the device 160. This results in pressurization of line 168 so that pressure is maintained at the neutral port 102 of the actuator thereby preventing the actuator from reverting to the reverse condition.

However, in accordance with one of the aspects of the present invention the second control port 162 is coupled to a forward motion detector which is so constructed as to be capable of pressurizing the port 162 only in complete lack of forward motion of the vehicle. In other words the structure is such as to keep the pressure at the control point 162 at a low and ineffective level as long as there is any forward motion. Thus, associated with the motion detector, indicated at 170, is a series resistor 171 for conducting fluid from the supply 36 to control port 162, plus a variable resistor 172 which is coupled by a linkage 173 to the detector. The detector may have any desired drive connection 174 to the vehicle wheels.

The detector is so constructed and arranged that as long as the vehicle wheels are rotating in the forward direction, the resistor 172 serves as an effective vent, causing the pressure at inlet port 162 to be at a low level so that pressure is applied to the output port 163, pressurizing line 168, and hence port 102, to keep the indexing actuator in its neutral condition. However, when the vehicle is stopped, the transducer, via link 173, closes the venting resistor 172 causing build-up of pressure at control port 162, causing the output pressure to be removed from port 163 and the stream to be diverted, instead, to the vent 164. With pressure now removed from line 168, and port 102, the actuator is free to revert to its reverse condition.

One skilled in the art will appreciate that the forward motion detector may take many different forms without departing from the present invention. One form of such device is diagrammatically illustrated in FIG. 4 where it will be noted that resistor 172 is in the form of a nozzle or vent normally closed by a vane 173 urged in the closing direction by a spring 175. Interposed between the wheel connection 174 and the vane 173 is a rotary dashpot consisting of a rotor 176 connected to the wheels surrounded by a rockable stator 177. Any forward rotation of the wheels causes the rotor to turn in the direction of the arrow thereby dragging the stator 177, against the force of the spring, away from the nozzle 172 and into contact with a limit stop 178, thereby effectively venting the control port 162, causing the output port 163 to remain pressurized to prevent the actuator from moving out of its neutral condition. However, when the vehicle comes to a full stop, the rotor 176 no longer applies any torque, so that the spring 175 closes the vent 172 for development of full control pressure at port 162, shifting the stream to the vent 164, removing pressure from line 168 and port 102 of the actuator, thereby permitting the actuator to revert to the desired reverse state. As the vehicle backs up the direction of the rotor 176 is reversed so that its torque now is in a direction to aid spring 175 closing off vent 172 even more securely, insuring high pressure at control port 162 as long as the vehicle is backing.

Figures 4, 5, 6, 7:
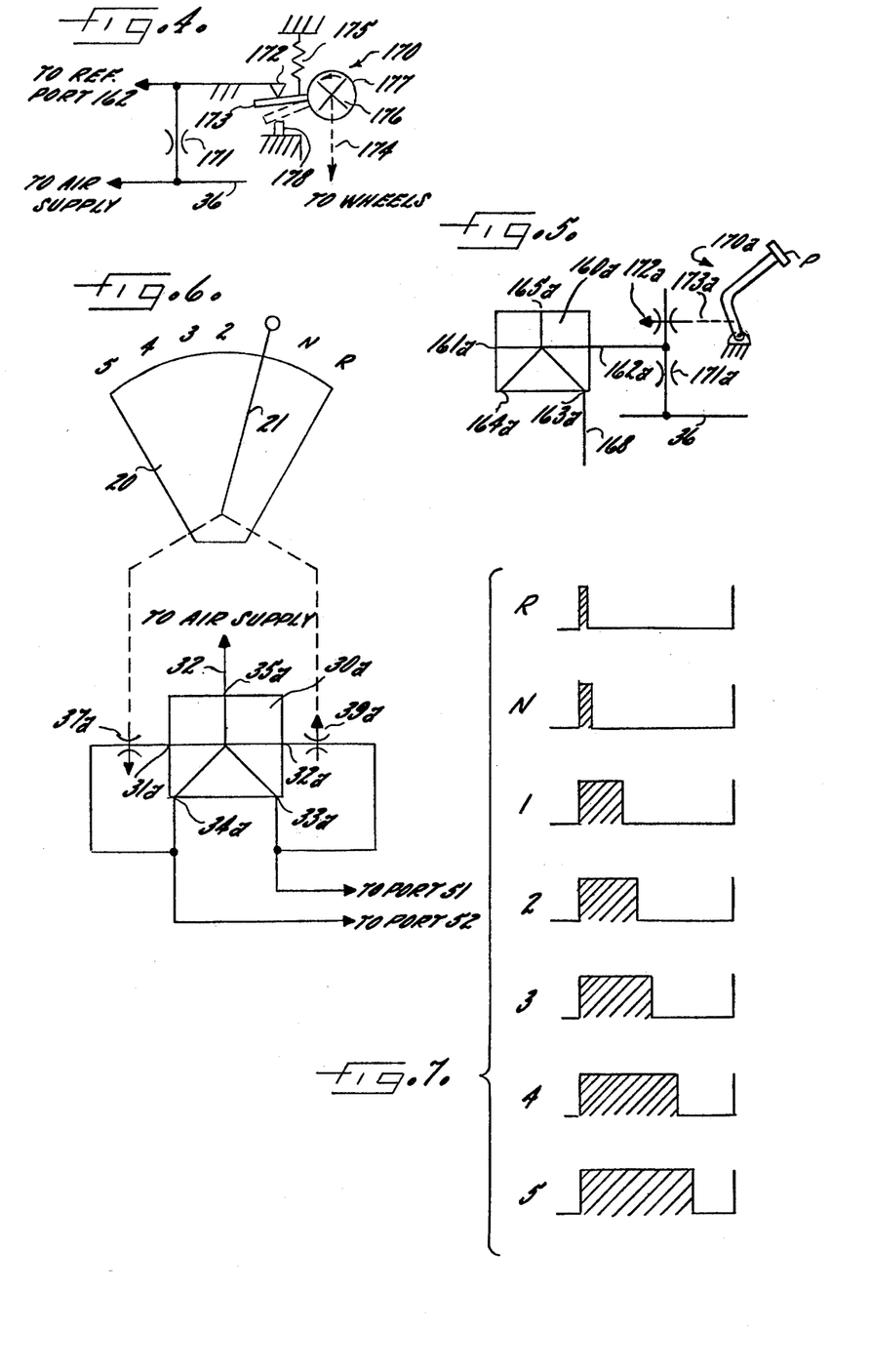
FIG. 4 shows schematically one form of vehicle forward motion detector.
FIG. 5 shows schematically a second form of motion detector utilizing the braking function.
FIG. 6 is schematic diagram showing an alternate form of fluidic oscillator characterized by substantially constant frequency over the control range.
FIG. 7 is a set of plots showing the progressive non-symmetry of the waveform achieved in the oscillator of FIG. 6.

If desired, the braking system of the vehicle may be employed as a forward motion detector as illustrated in FIG. 5 in which corresponding elements have been indicated by corresponding reference numerals with the addition of subscript a. Here the brake pedal P of the vehicle is connected by a link 173a to the variable venting resistor 172a so that when the pedal is fully depressed, the vehicle being braked to a halt, the venting resistor 172a is closed causing a back pressure at input port 162a which is capable of shifting the stream from output port 163a to the vented output port 164a, thereby removing pressure from line 168 permitting the indexing actuator to revert to the reverse gear setting. For the purpose of preventing the stream from reverting back to output port 163a as soon as pressure on the brake pedal P is released, in other words, for temporarily latching the bistable device 160a in a condition in which the output line 168 therefrom is pressurized, a heavily detented latching version of bistable device 160a is used; alternatively, latching circuitry may be utilized.

ALTERNATIVE FORM OF OSCILLATOR

In the preferred form of the invention described above, the fluidic oscillator employs two feedback loops, the impedance of one of the loops being varied by a manual quadrant lever while the impedance of the other remains constant, thereby varying both the frequency and dissymmetry of the output waveform to bring about the changes in the pressure applied to the control ports of the Schmitt triggers. However, in accordance with one of the aspects of the present invention the frequency may be kept constant while varying the degree of dissymmetry of the output waveform. This is accomplished by employing an oscillator as set forth in FIG. 6 in which the impedances in both of the feedback loops are connected to the quadrant lever 21 for variation simultaneously in opposite directions. Since each of the feedback loops controls one-half of the length of the oscillatory wave, variation of the length of each one-half wave in amounts which are substantially equal to, but opposite from, one another, has the effect of maintaining the same total wavelength while nevertheless varying the dissymmetry of the wave over a wide range. In describing the modified oscillator circuit similar reference numerals will be employed to designate similar elements, but again with addition of subscript a.

Thus I provide a symmetrical bistable fluidic device 30a having ports 31a–35a. Connected between ports 34a, 31a is a first impedance device 37a which may be in the form of a variable resistor and which determines the length of one-half of the total oscillatory wave. Similarly, connected between ports 33a, 32a is a second variable resistor 39a, and which determines the length of the second half of the wave. Both of the impedance devices 37a, 39a are mechanically coupled to the quadrant lever 21, but coupled thereto in opposite sense so that movement of the quadrant lever in one direction increases the value of one impedance device while accordingly decreasing the value of the other so that the dissymmetry of the wave is varied in opposite directions by moving the manual quadrant lever in opposite directions. Thus where only one of the output ports of the oscillator, or amplifier connected thereto, is fed into the manifold 70 the effect of the dissymmetry is to vary the percentage of "on" time, thereby to bring about a variation in pressure, both in the manifold and at the control input ports of the Schmitt triggers which are connected thereto. Typical waveforms at various quadrant positions, using the oscillator of FIG. 6, are set forth in FIG. 7, with the shaded half-waves showing clearly the change in "on" time as a function of quadrant lever position.

The term "quadrant" lever has been used herein for the sake of convenience to denote the lever which is manually set to achieve gear selection, but it will be understood that the term is not limited to the illustrated structure and indeed includes any settable or manipulated element employed for the purpose of manual gear selection. The term "on" time refers to the duration of the significant half-wave in a total oscillatory period. While it is preferred to employ a manifold 70 in the form of a chamber to which the control ports of the Schmitt triggers 81–87 are connected, it will be understood that no particular volume is required to perform the manifolding function. All that is necessary is that the volume of the piping be sufficiently great so that all of the Schmitt triggers have equal access to the pressure signal. Where mention is made of one function being "inversely related" to another, this will be understood to mean that where one function goes up the other goes down and vice versa, not necessarily proportionately. By reference to "a power actuator of the progressive indexing type" is meant a fluid actuator having a plurality of incrementally arranged ports and so constructed that application of pressure to the ports in cumulative sequence causes step by step indexed, or digital, advancement of the output member or plunger, and vice versa.

In the system described the Schmitt triggers are incrementally biased so that the trigger corresponding to reverse gear responds to the lowest pressure in the manifold and the trigger corresponding to the fifth gear responds to the highest pressure. However, the invention is not limited thereto and if desired the Schmitt trigger corresponding to the highest gear may be made the one which responds to lowest manifold pressure and the trigger corresponding to the reverse gear may respond to the highest manifold pressure provided, of course, that corresponding modification is made in the interlock circuitry to bring about the described interlocking functions. In either event, the Schmitt triggers in combination with the manifold perform the conversion of a dissymmetry signal, or frequency signal, to a pressure signal, with the Schmitt triggers in combination with the progressive indexing acutator acting, as well, as an analog-digital converter so that increments of quadrant movement bring about increments of movement of the remote actuator plunger, and hence digital movement of the spool valve which controls the transmission.

For assistance in practicing the present invention, commercial identification of typical fluidic elements utilized and described herein is as follows:

| Element | Numeral | Catalog Identification |
| --- | --- | --- |
| resistor-variable | 37, 37a, 39a | Corning Glass-#191484 |
| capacitor | 38 | Corning Glass-#192632 |
| resistor-fixed | 39, 91-97, 147, 150, 167, 171, 172 | Corning Glass-#190783 |
| bistable device | 30, 50, 60, 81-87 140, 160, 30a | Corning Glass-#191446 |
| Schmitt triggers | 81-87 | Corning Glass-#191448 |

What I claim is:

1. In a remote control system for an automotive transmission in an earth-moving vehicle or the like having a plurality of forward gears as well as neutral and reverse and a progressively movable gear shift member for selecting the same, the combination comprising a fluidic variable frequency oscillator having a variable feedback loop and a fixed feedback loop as well as a pair of on and off output ports, the variable feedback loop having both resistance and capacitance and having associated means including a manual quadrant lever for progressively varying at least one of them and settable at a plurality of successive transmission control positions so that when the quadrant lever is moved between spaced control positions the frequency of the signal at the output ports is swept through the frequencies corresponding to intermediate control positions, the waveform of the output signal being non-symmetrical having an "off" time which is substantially constant and an "on" time which varies in length inversely in accordance with frequency, a transmitter in the form of a bistable fluidic amplifier having a pair of control ports and a pair of on and off output ports, the transmitter control ports being directly coupled to the respective oscillator output ports, a receiver in the form of a second bistable amplifier having a pair of control ports and a pair of on and off output ports, a pair of conduits for connecting the output ports of the transmitter to the control ports of the receiver for remote driving of the latter with substantial preservation of the oscillator waveform, a manifold, the off output port of the receiver being vented while the on output port of the receiver is connected to the manifold for developing a pressure therein which varies inversely with the frequency of the signal at the receiver output port, a plurality of Schmitt triggers corresponding to respective transmission settings, each of the Schmitt triggers having a control input port, a reference input port, a vent, and an output port, the control input ports of all of the Schmitt triggers being connected to the manifold, means for applying biasing pressure to each of the reference ports with the biasing pressures being progressively stepped so that pressure is produced at the output ports of the Schmitt triggers in succession in step with progressive movement of the manual quadrant lever into successive control positions, and a power actuator of the progressive indexing type having a series of ports and a plunger, the actuator ports being connected to the output ports of the respective Schmitt triggers, and the plunger of the actuator having a connection to the gear shift member of the transmission so that when the manual quadrant lever is moved between spaced control positions the transmission selectively goes through the gears corresponding to all of the intermediate positions thereby to provide smooth transition regardless of the magnitude of the change in gear ratio.

2. In a control system for an automotive transmission in an earth-moving vehicle or the like having a plurality of forward gears as well as neutral and reverse and a progressively movable gear shift member for selecting the same, the combination comprising a fluidic variable frequency oscillator means having a variable feedback loop and a fixed feedback loop as well as a pair of on and off output ports, the variable feedback loop having a variable impedance, means including a manual quadrant lever for progressively varying the impedance and settable at a plurality of successive transmission control positions so that when the quadrant lever is moved between spaced control positions the frequency of the signal at the output ports is swept through the frequencies corresponding to intermediate control positions, the waveform of the output signal being non-symmetrical having an "off" time which is substantially constant and an "on" time which varies in length inversely in accordance with frequency, a manifold, the on output port being coupled to the manifold for developing a pressure therein which varies depending upon the frequency of the signal, a plurality of Schmitt triggers corresponding to respective transmission settings, each of the Schmitt triggers having a control input port, a reference input port, a vent, and an output port, the control input ports of all of the Schmitt triggers being connected to the manifold, means for applying biasing pressure fluid to each of the reference ports with the biasing pressure being progressively stepped so that pressure fluid is produced at the output ports of the Schmitt triggers in cumulative succession in step with progressive movement of the manual quadrant lever into successive control positions, and a power actuator of the progressive indexing type having a series of ports and a plunger, the actuator ports being respectively connected to the output ports of the respective Schmitt trigger devices, and the plunger of the actuator having a connection to the gear shift member of the transmission so that when the manual quadrant lever is moved between spaced control positions the transmission selectively goes through the gears corresponding to all of the intermediate positions thereby to provide smooth transition regardless of the magnitude of the change in gear ratio.

3. In a control system for an automotive transmission in an earth-moving vehicle or the like having a plurality of forward gears as well as neutral and reverse and a progressively movable gear shift member for selecting the same, the combination comprising a fluidic oscillator having first and second feedback loops as well as a pair of on and off output ports alternately pressurized at the operating frequency, means including a manual quadrant lever for progressively varying the impedance of at least one of the loops and settable at a plurality of successive transmission control positions so that when the quadrant lever is moved between spaced control positions the dissymmetry of the waveform of the output signal is progressively varied thereby to vary the ratio of on time with respect to off time, a transmitter in the form of a bistable fluidic amplifier having a pair of control ports and a pair of on and off output ports, the transmitter having at least one of its control ports coupled to the respective oscillator output port, a receiver in the form of a second bistable amplifier having a pair of control ports and a pair of on and off output ports, a pair of conduits for connecting the output ports of the transmitter to the inlet ports of the receiver for control of the latter with substantial preservation of the oscillator waveform, a manifold, the on output port of the receiver being connected to the manifold for developing a pressure therein which varies with the dissymmetry of the signal at the receiver on output port, a plurality of Schmitt triggers corresponding to respective transmission setting, each of the Schmitt triggers having a control input port, a reference input port, a vent, and an output port, the control input ports of all of the Schmitt triggers being connected to the manifold, means for applying biasing pressure fluid to each of the reference ports with the biasing pressures being progressively stepped so that pressure fluid is produced at the output ports of the Schmitt triggers in cumulative succession in step with progressive movement of the manual quadrant lever into successive control positions, and a power actuator of the progressive indexing type having a series of ports and a plunger, the actuator ports being respectively connected to the output ports of the respective Schmitt triggers, and the plunger of the actuator having a connection to the gear shift member of the transmission so that when the manual quadrant lever is moved betweeh spaced control positions the transmission selectively goes through the gears corresponding to all of the intermediate positions thereby to provide smooth transition regardless of the magnitude of the change in gear ratio.

4. In a control system for an automotive transmission in an earth-moving vehicle or the like having a plurality of forward gears as well as neutral and reverse and a progressively movable gear shift member for selecting the same, the combination comprising a fluidic oscillator having an on output port which is periodically pressurized at the frequency of the oscillator, the oscillator having adjusting means for varying the proportion of the time that the port is turned on during each period, means including a manual quadrant lever coupled to the adjusting means and settable at a plurality of successive transmission control positions, a manifold, the output port being coupled to the manifold for developing a pressure therein which varies in accordance with the proportion of on time, a plurality of Schmitt triggers corresponding to respective transmission settings, each of the Schmitt triggers having a control input port, a reference input port, an output port, and a vent, the control input ports of all of the triggers being connected to the manifold, means for applying biasing pressure fluid to each of the reference ports with the biasing pressure being progressively stepped so that pressure fluid is produced at the output ports of the Schmitt triggers in cumulative succession in step with progressive movement of the manual quadrant lever into successive control positions, and a power actuator of the progressive indexing type having a series of ports and a plunger, the actuator ports being respectively connected to the output ports of the respective Schmitt triggers, and the plunger of the actuator having a connection to the gear shift member of the transmission so that when the manual quadrant lever is moved between spaced control positions the transmission selectively goes through the gears corresponding to all of the intermediate positions thereby to provide smooth transition regardless of the magnitude of the change in gear ratio.

5. In a control system for an automotive transmission in an earth-moving vehicle or the like having a plurality of forward gears as well as neutral and reverse and a progressively movable gear shift member for selecting the same, the combination comprising a fluidic oscillator having an output port and first and second feedback loops, each loop having impedance means for determining the length of one-half of a complete oscillatory wave, means for adjusting the impedance means in at least one of the loops to produce a non-symmetric waveform, the adjusting means including a manual quadrant lever settable at a plurality of successive transmission control positions so that when the quadrant lever is moved between spaced control positions the dissymmetry of the signal at the output port is swept through conditions corresponding to intermediate control positions, a manifold, the output port being coupled to the manifold for developing of pressure therein which depends upon the degree of dissymmetry of the waveform, a plurality of Schmitt triggers corresponding to respective transmission settings, each of the Schmitt triggers having a control input port, a reference port, a vent, and an output port, the control input ports of all of the Schmitt triggers being connected to the manifold, means for applying biasing pressure fluid to each of the reference ports with the biasing pressure being progressively stepped so that a pressure fluid condition is produced at the output ports of the Schmitt triggers in cumulative succession in accordance with progressive movement of the manual quadrant lever into successive control positions, and a power actuator of the progressive indexing type having a series of ports and a plunger, the actuator ports being connected to the output ports of the respective Schmitt triggers and the plunger of the actuator having a connection to the gear shift member of the transmission so that when the manual quadrant lever is moved between spaced control positions the transmission is shifted through the gears corresponding to all of the intermediate control positions thereby to provide smooth transition regardless of the magnitude of change of gear ratio.

6. The combination as claimed in claim 1 or claim 2 or claim 3 or claim 4 or claim 5 including an engine speed responsive interlock device, the interlock device being connected to the Schmitt trigger associated with the first gear setting of the gear shift member for inhibiting movement of the gear shift member out of the neutral setting into the first gear setting as long as the engine is running at an excessive speed.

7. The combination as claimed in claim 1 or claim 2 or claim 3 or claim 4 or claim 5 including an engine speed responsive interlock device, a speed transducer coupled to the engine for producing a reference speed signal in the form of a fluid pressure which varies in accordance with the speed of the engine, the interlock device being in the form of a bistable element having a control input port, a reference input port, on and off output ports, and a supply port, the supply port and the control input port being coupled to the output port of the Schmitt trigger corresponding to first gear, the on output port being connected to the corresponding actuator port, and the reference input port being coupled to the transducer so that the quadrant lever, upon being moved into or through its first gear position is capable of shifting the transmission into first gear only when the engine speed is at a suitably low level.

8. The combination as claimed in claim 1 or claim 2 or claim 3 or claim 4 or claim 5 including a vehicle forward motion interlock device, the interlock device being connected to the Schmitt trigger associated with the neutral setting of the gear shift member for inhibiting movement of the gear shift member out of the neutral setting into the reverse gear setting as long as the vehicle is in forward motion.

9. The combination as claimed in claim 1 or claim 2 or claim 3 or claim 4 or claim 5 including a vehicle motion interlock device, the interlock device including a forward motion detector and a bistable fluidic element having a control input port, a reference input port, on and off output ports, and a supply port, the supply port and the control input port being connected to the output port of the Schmitt trigger corresponding to the reverse gear, the on output port being connected to the neutral actuator port, and the reference input port being coupled to the detector so that the quadrant lever upon being moved into reverse gear is enabled to shift the transmission into reverse gear only when the motion detector indicates that the vehicle has come to a substantial standstill.

10. The combination as claimed in claim 1 or claim 2 or claim 3 or claim 4 or claim 5 including a vehicle motion interlock device, the interlock device including a bistable fluidic element having a control input port, a reference input port, on and off input ports and a supply port, the control input port being connected to the output port of a Schmitt trigger corresponding to the reverse gear, the on output port being connected to the neutral actuator port, a forward motion detector in the form of a brake sensor arranged to produce an output signal when the brake is fully applied, the reference input port being connected to respond to the brake sensor so that the quadrant lever upon being moved into reverse gear is enabled to shift the transmission into reverse gear only when the brake sensor has produced an output signal thereby indicating that the vehicle has come to a substantial standstill.

11. The combination as claimed in claim 5 in which the manual quadrant lever is coupled to the impedance means in both of the feedback loops for simultaneous variation thereof in opposite directions but to equal degree so as to provide a wide variation in the dissymmetry of the oscillatory wave while preserving the frequency of the wave substantially constant.

* * * * *